United States Patent

Zurbriggen et al.

[11] Patent Number: 6,129,937
[45] Date of Patent: *Oct. 10, 2000

[54] FLAVORING AGENT

[75] Inventors: Beat Denis Zurbriggen, Buelach; Bengt Bengtsson, Seuzach, both of Switzerland

[73] Assignee: Nestec S.A., Vevey, Switzerland

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/666,530

[22] PCT Filed: Oct. 25, 1995

[86] PCT No.: PCT/EP95/04199

§ 371 Date: Jul. 1, 1996

§ 102(e) Date: Jul. 1, 1996

[87] PCT Pub. No.: WO96/13988

PCT Pub. Date: May 17, 1996

[30] Foreign Application Priority Data

Nov. 4, 1994 [EP] European Pat. Off. ............. 94117413

[51] Int. Cl.$^7$ .......................... C07K 14/415; C12N 9/00; C12P 1/00

[52] U.S. Cl. ............................. 426/44; 426/28; 426/622; 426/627; 426/620; 426/64; 426/51; 426/52; 426/533; 426/655; 426/49; 426/50; 426/650; 435/68.1

[58] Field of Search .................... 426/44, 28, 622, 426/627, 620, 64, 51, 52, 533, 655, 49, 50, 650; 435/68.1

[56] References Cited

U.S. PATENT DOCUMENTS

| | | | |
|---|---|---|---|
| 4,180,591 | 12/1979 | Kazuo et al. | 426/18 |
| 4,371,551 | 2/1983 | Fulger et al. | 426/28 |
| 4,380,551 | 4/1983 | Frontczak | 426/28 |
| 4,613,507 | 9/1986 | Fugler et al. | 426/28 |
| 5,405,624 | 4/1995 | Doncheck et al. | 426/11 |
| 5,476,773 | 12/1995 | Heyland et al. | 435/68.1 |

FOREIGN PATENT DOCUMENTS

| | | |
|---|---|---|
| 0 320 717 | 6/1989 | European Pat. Off. . |
| 70 26875 | 7/1971 | France . |

*Primary Examiner*—Phuong T. Bui
*Attorney, Agent, or Firm*—Pennie & Edmonds LLP

[57] ABSTRACT

Flavoring agent obtained by a process in which seeds of an edible plant are germinated, the sprouts obtained are matured under the effect of their endogenous enzymes, an optional fermentation of these sprouts is envisaged with at least one microorganism, the enzymes and/or microorganism are inactivated and all or part of the matured and/or fermented sprouts is recovered, and use of this flavoring agent as raw material for the preparation of products of the Maillard reaction, alone or mixed with other materials rich in flavor precursors and/or enhancers.

26 Claims, No Drawings

FLAVORING AGENT

TECHNICAL FIELD

The subject of the present invention is a process for the preparation of a flavoring agent as well as a use of this agent.

BACKGROUND ART

The use of germinated seeds in the human diet, especially the use of germinated cereals such as barley in the manufacture of beer, has been known since antiquity.

However, more recent uses of the enzymes produced in the newly formed sprout during the germination of the seed are also known.

EP 0,320,717 (ENIRICERCHE S.p.A), for example, describes a process for the preparation of enzymatic hydrolysates of proteins free of bitterness, using enzymes extracted from germinated sorghum seeds.

There still remains a need for flavoring agents which take a more direct and more complete advantage of the potential flavor content of the seeds of an edible plant, as well as a precise use of the agent thus prepared.

SUMMARY OF THE INVENTION

In the process for the preparation of a flavoring agent according to the present invention, seeds of an edible plant are germinated, the sprouts obtained are matured under the effect of their endogenous enzymes, the enzymes are inactivated and all or part of the matured sprouts is recovered.

Likewise, within the framework of the present invention, the flavoring agent is used as raw material for the preparation of products of the Maillard reaction, alone or mixed with other materials rich in flavor precursors and/or enhancers.

DETAILED DESCRIPTION OF THE PREFERRED EMBODIMENTS

In order to implement the present process, seeds of a plant containing proteins rich in cysteine or methionine, and/or containing hemicelluloses rich in reducing sugars such as xylose, arabinose or glucose, and/or rich in galacturonic acid, for example, may be used as starting material. Preferably, seeds of a plant chosen from the group formed by leguminous plants, cereals, oleaginous plants and crucifers may be used as starting materials. The use of lucerne, radish, fenugreek, lentil, pea and bean seeds, for example, may be particularly recommended.

In order to germinate the seeds, they may be previously steeped for 0–30 h at 15–30° C., in pure water or water supplemented with 0–5% sodium chloride as stabilizing agent.

The seeds, optionally previously steeped, may be placed in a suitable chamber containing an atmosphere whose hygroscopicity and temperature can be regulated and comprising means for sprinkling water over the germinating seeds.

The seeds may be germinated for 1–10 d at 15–30° C. while intermittently spraying them with pure water or water supplemented with 0–5% sodium chloride as stabilizing agent.

Preferably, the seeds are germinated in a controlled atmosphere until the sprouts have a dry matter content of between about 20 and 50%.

The sprouts can be matured, under the effect of their endogenous enzymes, at a temperature of between more than 30° C. and 70° C., preferably at about 45–65° C., for 12–72 h, for example. The process of maturation, or hydrolysis, is performed in a manner such that the water content of the material is maintained. The term "maintained" as used herein does not mean keeping the moisture content at a specific value, but rather the term "maintained" as used herein means that the water content of the material is sufficient such that hydrolysis continues under the action of endogenous enzymes throughout the process of hydrolysis. The whole sprouts can be matured in an atmosphere with a high relative humidity or with some water, and they may then be reduced to a purée, especially by homogenization. They may also be matured in puree form, after homogenizing them The enzymes may then be inactivated at about 80–95° C. for about 2–30 min.

The sprouts may then be dehydrated, especially by drying under reduced pressure, or a soluble extract of the matured sprouts may be prepared and this extract may be dried, especially by spray-drying.

In a first variant of the present process, a plant material rich in proteins, especially wheat gluten, is mixed with the sprouts before they are matured.

In a second variant of the present process, exogenous enzymes are also added to the sprouts during their maturation, especially in order to reduce the viscosity of the purée.

In a third variant of the present process, a fermentation of the seeds, during their germination, and/or of the whole sprouts and/or of the sprouts in subdivided form, especially in purée form, is in addition envisaged, with at least one microorganism of interest as regards its flavoring or acidifying power and/or its ability to degrade the reducing sugars and thereby to enhance the storage life of the present product preferably at least one microorganism chosen from *Lactobacillus plantarum, Lactobacillus sake, Bacillus natto, Saccharomyces cerevisiae, Lactobacillus carnis, Staphylococcus xylosus, Debaryomyces hansenii, Pediococcus pentosaceus, Penicillium nalgiovensis* and mixtures thereof maybe used.

The flavoring agent prepared by the process according to the present invention may be used as it is, in dehydrated form or otherwise, to flavor dishes, sauces or broths.

Within the framework of the present invention, it is therefore also envisaged to use this flavoring agent as raw material for the preparation of products of the Maillard reaction, alone or mixed with other materials rich in flavor precursors and/or enhancers, such as a soyabean sauce or a yeast autolysate, or even with certain reducing sugars or certain substances rich in sulphur in the sulphide state, such as cysteine, cysteine, methionine or thiamine.

In order to carry out such a reaction, a mixture may be prepared having a water content of about 35–55% and comprising, in % by weight of dry matter, about 24–98% of the present flavoring agent, about 2–40% of sodium chloride, 0–4% of added reducing sugar, 0–2% of a sulphur-containing substance, 0–15% of monosodium glutamate and 0–15% of sucrose.

The mixture may be caused to react by heating at 80–150° C., preferably 120–150° C., for 1 min to 4 h, preferably for 1 to 40 min, relatively short durations corresponding to relatively high temperatures and conversely.

The reaction product may then be dried to a residual water content of less than or equal to 2%.

It is possible to perform the reaction and the drying in two separate apparatuses, especially in an autoclave or in a band cooker and in a vacuum dryer, and then to crush or grind, in a hammer mill, the compact mass obtained. It is also possible to carry out the reaction and the drying by extrusion cooking in a twin-screw extruder, and to carefully cut or grind the expanded pudding obtained.

EXAMPLES

The examples below illustrate various embodiments of the process for the preparation of the flavoring agent, variants of the process and of the use of the flavouring agent according to the present invention.

In these examples, total nitrogen (Ntot) was determined by the Kjeldahl method. The protein content is defined and calculated as the product Ntot×6.25. The alpha-amino nitrogen (Nalpha) was determined by the Slyke method. The degree of hydrolysate is determined as the quotient Nalpha/Ntot. The glutamic acid (Glu) content is determined enzymatically. The dry matter (DM) content is determined after drying for 4 h at 70° C., at 20 mbar. The percentages are given by weight, relative to the total weight (%) or relative to the weight of dry matter (% DM).

Example 1

1 kg of daikon radish (Raphanus sativus) is steeped in 4 l of water for 16 h at 25° C. They are drained and they are placed in a chamber containing an atmosphere whose hydroscopicity and temperatures can be regulated and comprising means for sprinkling water over the germinating seeds.

In this chamber, the seeds are allowed to germinate for 8 d at 20° C. while spraying or sprinkling them with water every two hours.

The sprouts thus obtained are cut into small pieces and they are matured at 40° C. for 48 h under the effect of their endogenous enzymes. The enzymes are inactivated by heating the mass of matured sprout pieces at 90° C. for 12 min. The mass is dried at 60° C. at a reduced pressure of 20 mbar for 8 h and it is reduced to a powder.

A powdered flavouring agent is obtained which can be used as it is, in other words which can be sprinkled on various dishes to enhance their flavour.

Example 2

Lucerne (Medicago sativa) seeds are steeped in water for 15 h at 25° C. They are germinated in a suitable chamber similar to that described in Example 1, for 2, 4 and 6 d at 25° C., while spraying them with water every 12 h. The sprouts are homogenized, they are matured at 55° C. for 24 or 48 h, they are heated at 90° C. for 3 min in order to inactivate the enzymes, and they are dried at 65° C. under reduced pressure for 6–7 h.

The dry matter, total nitrogen, alpha-amino nitrogen and glutamic acid content is determined, and the alpha-amino nitrogen/total nitrogen and glutamic acid/protein quotients of the flavouring agent thus obtained are produced.

The results obtained are presented in Table 1 below where the values obtained for sprouts not matured or dried are also indicated for comparison:

TABLE 1

| Germination (d) | Maturation (h) | DM (%) | Ntot (% DM) | Nalpha (% DM) | Glu (% DM) | Nalpha/Ntot (%) | Glu/protein (%) |
|---|---|---|---|---|---|---|---|
| 2 | 0  | 20.2 | 6.43 | 0.99 | 0.09 | 15.39 | 0.22 |
| 2 | 24 | 98.5 | 5.98 | 1.00 | 0.31 | 16.72 | 0.83 |
| 2 | 48 | 98.1 | 6.22 | 1.19 | 0.33 | 19.13 | 0.85 |
| 4 | 0  | 8.8  | 6.59 | 1.59 | 0.08 | 24.13 | 0.19 |
| 4 | 24 | 97.8 | 6.33 | 1.90 | 0.36 | 30.02 | 0.91 |
| 4 | 48 | 97.1 | 6.59 | 2.04 | 0.50 | 30.96 | 1.21 |
| 6 | 0  | 7.6  | 5.92 | 1.57 | 0.12 | 26.52 | 0.32 |
| 6 | 24 | 98.1 | 6.93 | 2.14 | 0.43 | 30.88 | 0.99 |
| 6 | 48 | 98.3 | 6.91 | 2.23 | 0.60 | 32.27 | 1.39 |

It can be seen from this table that for germination periods of 2, 4 and 6 d and for maturation periods of 24 and 48 h, the content of glutamic acid, an important flavor enhancer, increases remarkably compared with the contents determined, for comparison, for a zero maturation time. A similar observation is made for the alpha-amino nitrogen content. Most particularly advantageous values of the alpha-amino nitrogen/total nitrogen and glutamic acid/protein quotients are noted from a germination period of 4 d and a maturation period of 24 h.

Example 3

The procedure is carried out in the manner described in Example 2, with daikon radish, fenugreek (Trigonella phoenum-graceum), yellow lentils (Lens esculenta), green pea (Pisum sativum) and mung bean (Phaseolus radiatus) seeds, for a germination period of 4 d and for a maturation period of 24 h.

The dry matter, total nitrogen, alpha-amino nitrogen and glutamic acid content is determined and the alpha-amino nitrogen/total nitrogen and glutamic acid/protein quotients of the flavouring agent thus obtained are produced.

The results obtained are presented in Table 2 below where the values obtained for sprouts not matured or dried are also indicated for comparison:

TABLE 2

| Seed | Germination (d) | Maturation (h) | DM (%) | Ntot (% DM) | Nalpha (% DM) | Glu (% DM) | Nalpha/Ntot (%) | Glu/protein (%) |
|---|---|---|---|---|---|---|---|---|
| Daikon radish | 4 | 0  | 13.4 | 5.07 | 0.53 | 0.16 | 10.45 | 0.50 |
|               |   | 24 | 98.1 | 4.79 | 0.83 | 0.54 | 17.32 | 1.80 |
| Fenugreek     | 4 | 0  | 8.0  | 5.00 | 0.63 | 0.20 | 12.60 | 0.64 |
|               |   | 24 | 97.4 | 5.44 | 1.62 | 0.47 | 29.78 | 1.38 |
| Lentils       | 4 | 0  | 15.8 | 6.20 | 0.95 | 0.22 | 15.32 | 0.57 |
|               |   | 24 | 96.9 | 4.95 | 1.45 | 0.66 | 29.29 | 2.13 |

TABLE 2-continued

| Seed | Germination (d) | Maturation (h) | DM (%) | Ntot (% DM) | Nalpha (% DM) | Glu (% DM) | Nalpha/ Ntot (%) | Glu/ protein (%) |
|---|---|---|---|---|---|---|---|---|
| Pea | 4 | 0 | 22.5 | 4.62 | 0.57 | 0.25 | 12.34 | 0.86 |
|  |  | 24 | 96.6 | 4.76 | 0.95 | 0.67 | 19.96 | 2.25 |
| Mung bean | 4 | 0 | 13.0 | 5.15 | 1.07 | 0.12 | 20.78 | 0.37 |
|  |  | 24 | 97.9 | 4.59 | 1.07 | 0.46 | 23.31 | 1.60 |

It can be seen from this Table 2 that for each of these seeds, for a germination period of 4 d and for a maturation period of 24 h, the glutamic acid content increases remarkably compared with the content determined, for comparison, for a zero maturation time. A similar observation is made for the alpha-amino nitrogen content.

Example 4

The procedure is carried out in the manner described in Example 3 for mung beans. After the 24 h maturation and the inactivation of the enzymes, a portion of sprouts is homogenized with a portion of water. The homogenized mixture is centrifuged and a clear solution is recovered which is concentrated and which is spray-dried.

The flavoring agent thus obtained has a relatively neutral flavor and is particularly suitable for use as raw material for the preparation of products of the Maillard reaction.

Example 5

The procedure is carried out in the manner described in Example 2 for lucerne until sprouts are obtained after germinating for 4 d. Before maturation, a portion of the sprouts is homogenized with an equal portion by weight of wheat gluten dry matter. The mixture is then matured for 48 h at 40° C., it is heated for 3 min at 90° C. in order to inactivate the enzymes and it is spray-dried.

The flavoring agent thus obtained comprises a mixture of peptides and amino acids obtained from using sprouts and from wheat gluten. It is particularly suitable for use as raw material for the preparation of products of the Maillard reaction.

Example 6

The process is carried out in the manner described in Example 3 for daikon radish until sprouts are obtained after germinating for 4 d. The sprouts are cut into small pieces and they are supplemented with 2% sodium chloride. They are inoculated with a commercial *Lactobacillus plantarum* culture, they are allowed to ferment and mature for 48 h at 32° C., and they are heated for 10 min at 90° C. in order to inactivate the bacteria and the enzymes.

The flavoring agent thus obtained has a particularly strong flavor.

Example 7

Lentil seeds are steeped in water Nor 12 h at 20° C. They are germinated in a suitable chamber for 4 d at 23° C., while spraying them with water every 6 h. The sprouts are homogenized and they are inoculated with a commercial *Bacillus natto* culture. They are fermented for 24 h at 37° C. The temperature is raised to 55° C., they are allowed to mature for 24 h at this temperature, they are heated at 90° C. for 10 min in order to inactivate the bacteria and the enzymes, and they are dried at 60° C. at a reduced pressure of 20 mbar for 8 h.

The dry matter, total nitrogen, alpha-amino nitrogen, glutamic acid and reducing sugar (RS) content is determined and the alpha-amino nitrogen/total nitrogen quotient of the flavoring agent thus obtained is produced.

The results obtained are presented in Table 3 below where the corresponding values obtained in Example 3 for lentils are reproduced in order to facilitate comparison:

TABLE 3

| Germination (d) | DM (%) | Ntot (% DM) | Nalpha (% DM) | Nalpha/ Ntot (%) | Glu (% DM) | RS (% DM) |
|---|---|---|---|---|---|---|
| 4 | 97.9 | 4.3 | 1.27 | 29.53 | 0.97 | 1.06 |
| 4 (Ex 3) | 96.9 | 4.95 | 1.45 | 29.29 | 0.66 | 4.79 |

Thus, if the results obtained in the present example are compared with those obtained in Example 3 for lentils, it can be seen that they are very similar, with the exception of the glutamic acid content and especially of the reducing sugar content. The latter is considerably lower in the flavoring agent obtained in the present example, which ensures a better storage life.

Example 8

Lentil seeds are steeped in water for 12 h at 20° C. They are germinated in a chamber under a controlled atmosphere containing 100% humidity and in the dark for 6 d at 30° C. A portion A of the sprouts is homogenized before allowing them to mature for 24 h at 55° C. A portion B of the sprouts is allowed to mature for 24 h at 55° C. and they are then homogenized. Sprouts A and B are then heated at 90° C. for 3 min in order to inactivate the enzymes and they are dried at 60° C. at a reduced pressure of 20 mbar for 8 h.

The dry matter, total nitrogen, alpha-amino nitrogen and glutamic acid content is determined and the alpha-amino nitrogen/total nitrogen quotient of the flavoring agents thus obtained is produced.

The results obtained are presented in Table 4 below where the values obtained for a maturation time equal to zero have also been indicated for comparison.

TABLE 4

| Maturation (h) | DM (%) | Ntot (% DM) | Nalpha (% DM) | Nalpha/Ntot (%) | Glu (% DM) |
|---|---|---|---|---|---|
| 0 | 38.1 | 3.99 | 0.21 | 5.26 | 0.05 |
| 24 (A) | 97.5 | 4.10 | 0.76 | 18.53 | 0.18 |
| 24 (B) | 99.1 | 4.30 | 0.50 | 11.63 | 0.14 |

It can be seen from this Table 4 that the dry matter content of the sprouts obtained by germination in a controlled atmosphere and in the dark reaches remarkably high values. It can also be seen that the degree of hydrolysis of the sprouts homogenized before maturation is considerably greater than the degree of hydrolysis of the sprouts homogenized after maturation.

Example 9

Lentil seeds, germinated, fermented with a *Bacillus natto* culture, matured and inactivated are prepared in the manner described in Example 7.

This flavoring agent is mixed with water, xylose, sodium chloride, cysteine, monosodium glutamate and sucrose in proportions such that the mixture obtained has a water content of 49% and comprises, in % by weight of dry matter, 40% dry matter of the said flavouring agent including 0.44% reducing sugars, 1.5% xylose, 34% sodium chloride, 1.5% cysteine, 11.5% monosodium glutamate and 11.5% sucrose.

The mixture is caused to react by heating a jacketed tank at 100° C. for 3 h. It is dried at a reduced pressure of 15 mbar at 95° C. to a dry matter content of 1.5%. It is crushed and it is reduced to a powder.

In order to taste this product of the Maillard reaction, 5 g of it, supplemented with 5 g of sodium chloride, are dissolved in 1 l of boiling water. The water thus flavored has a pleasant taste, free of any bitterness, similar to that of a meat stock, and it does not have the characteristic and penetrating odour of traditional natto.

Example 10

Powdered flavoring agent obtained in Example 4 is mixed with water, xylose, sodium chloride, cysteine, monosodium glutamate and sucrose in proportions such that the mixture obtained has a water content of 40% and comprises, in % by weight of dry matter, 40% dry matter of the flavoring agent including 2.4% reducing sugars, 1.5% xylose, 34% sodium chloride, 1.5% cysteine, 11.5% monosodium glutamate and 11.5% sucrose.

The mixture is caused to react by heating in a jacketed tank at 120° C. for 40 min. It is dried, it is crushed and it is reduced to a powder.

A product of the Maillard reaction is obtained which, when tasted under the same conditions as that of Example 9, has a pleasant taste, lacking any bitterness, similar to that of a meat stock.

Example 11

Powdered flavoring agent obtained in Example 5 is mixed with water, xylose, sodium chloride, cysteine, monosodium glutamate and sucrose in proportions such that the mixture obtained has a water content of 43% and comprises, in % by weight of dry matter, 40% dry matter of the said flavouring agent including 1.8% reducing sugars, 1.5% xylose, 34% sodium chloride, 1.5% cysteine, 11.5% monosodium glutamate and 11.5% sucrose.

The mixture is caused to react by heating in a jacketed tank at 120° C. for 40 min. It is dried, it is crushed and it is reduced to a powder.

A product of the Maillard reaction is obtained which, when tasted under the same conditions as that of Example 9, has a pleasant taste, lacking any bitterness, similar to that of a meat stock.

What is claimed is:

1. A process for the preparation of a flavoring agent, comprising the steps of:
    choosing seeds of an edible plant selected from the group consisting of leguminous plants, cereals, oleaginous plants, and crucifers,
    germinating said seeds to produce sprouts;
    hydrolyzing the sprouts under the effect of endogenous enzymes in the presence of an environment of water and/or humidity such that the water content of the sprouts is maintained and at a temperature above 30° C. to 65° C. for 12 to 72 hours;
    inactivating the enzymes; and
    recovering all or part of the hydrolyzed sprouts as the flavoring agent.

2. The process of claim 1, wherein said seeds are selected from the group consisting of leguminous plants, oleaginous plants and crucifers and are germinated for 1–10 days at 15–30° C. while spraying them intermittently.

3. The process of claim 1, wherein said enzymes are inactivated for 2–30 minutes at 80–95° C.

4. The process of claim 1, wherein said seeds are germinated in a controlled atmosphere until the sprouts have a dry matter content of between 20 and 50%.

5. The process of claim 1, further comprising: dehydrating the hydrolyzed sprouts by drying under reduced pressure; cutting the dried sprouts into pieces; and reducing the dried sprouts into powder for use as the flavoring agent.

6. The process of claim 1, further comprising: preparing a soluble extract of the hydrolyzed sprouts; and spray-drying the extract for use as the flavoring agent.

7. The process of claim 1, further comprising mixing a plant material rich in proteins with the sprouts before hydrolyzing.

8. The process of claim 1, further comprising adding exogenous enzymes to the sprouts during hydrolysis.

9. The process of claim 1, further comprising the step of fermenting the seeds during germination, and/or the whole sprouts and/or the sprouts in subdivided form, with at least one microorganism having a flavoring or acidifying power and/or an ability to degrade the reducing sugars.

10. A process for the preparation of a flavoring agent comprising:
    choosing seeds of an edible plant from the group consisting of leguminous plants, cereals, oleaginous plants, and crucifers;
    germinating said seeds to produce sprouts;
    fermenting said seeds during germination, and/or the whole sprouts and/or the sprouts in subdivided form with at least one microorganism chosen from the group consisting of *Lactobacillus plantarum, Lactobacillus sake, Saccharomyces cerevisiae, Lactobacillus carnis, Staphylococcus xylosus, Debaryomyces hansenii, Pediococcus pentosaceus, Penicillium nalgiovensis* and mixtures thereof;
    hydrolyzing the sprouts under the effect of endogenous enzymes in the presence of an environment of water and/or humidity such that the water content of the sprouts is maintained and at a temperature above 30° C. to 65° C. for 12 to 72 hours;
    inactivating the enzymes; and
    recovering all or part of the hydrolyzed sprouts as the flavoring agent.

11. A first flavoring composition comprising about 24–98% of the flavoring agent of claim 6; about 2–40% of sodium chloride; 0–4% of added reducing sugar; 0–2% of a sulfur-containing substance; 0–15% of monosodium glutamate; and 0–15% of sucrose, with the percents calculated by weight of dry matter, and water in an amount of about 35–55% of the composition.

12. The composition of claim 11 wherein the reducing sugars are present in an amount of about 0.44 to 2.4%; the sulfur containing compound is cysteine and is present in an amount of about 1.5%; the monosodium glutamate is present in an amount of about 11.5%; and the sucrose is present in an amount of about 11.5%.

13. A method for producing a second flavoring composition which comprises: heating the composition of claim 11 to a temperature of between about 80 and 150° C. for a time of about 1 minute to 4 hours to form a reaction product; and drying the reaction product to a residual water content of less than a equal to 2% to form the flavoring composition.

14. The method of claim 13 wherein the composition is heated at about 120 to 150° C. for about 1 to 40 minutes.

15. A flavoring agent produced by the process of claim 13.

16. A flavoring agent produced by the process of claim 14.

17. The process of claim 1, wherein said hydrolyzing of said sprouts under the effect of endogenous enzymes is carried out at a temperature above 40° C. to below 55° C. for more than 48 and up to 72 hours.

18. A process for the preparation of a flavoring agent, comprising the steps of:

choosing seeds of an edible plant selected from the group consisting of leguminous plants, cereals, oleaginous plants, and crucifers, germinating said seeds to produce sprouts;

cutting, pureeing, or homogenizing at least a portion sprouts of the sprouts;

hydrolyzing the cut, pureed, and/or homogenized sprouts under the effect of endogenous enzymes in the presence of an environment of water and/or humidity such that the water content of the cut, pureed, and/or homogenized sprouts is maintained and at a temperature above 30° C. to 65° C. for 12 to 72 hours;

inactivating the enzymes; and recovering all or part of the hydrolyzed cut, pureed, and/or homogenized sprouts as the flavoring agent.

19. The process of claim 1, wherein hydrolyzing the sprouts is at a temperature between about 45° C. to about 65° C.

20. The process of claim 1, wherein hydrolyzing the sprouts is at a temperature between above 45° C. to about 55° C.

21. The process of claim 1, wherein the plant seeds are selected from the group consisting of radish, lucerne, lentil, pea, or mung bean.

22. The process of claim 1, wherein the hydrolyzed sprouts have a ratio of alpha-amino nitrogen to total nitrogen which is at least 8.6% greater than that of hydrolyzed sprouts which have not been subjected to the hydrolysis step.

23. The process of claim 10, wherein hydrolyzing the sprouts is at a temperature between about 45° C. to about 65° C.

24. The process of claim 18, wherein hydrolyzing the sprouts is at a temperature between about 45° C. to about 65° C.

25. A flavoring agent obtained by:

choosing seeds of an edible plant selected from the group consisting of leguminous plants, cereals, oleaginous plants, and crucifers, germinating said seeds to produce sprouts;

hydrolyzing the sprouts under the effect of endogenous enzymes in the presence of an environment of water and/or humidity such that the water content of the sprouts is maintained and at a temperature above 30° C. to 65° C. for 12 to 72 hours;

inactivating the enzymes; and recovering the hydrolyzed sprouts as the flavoring agent.

26. The flavoring agent of claim 25 wherein the step of hydrolyzing the sprouts is at a temperature between about 45° C. to about 65° C.

* * * * *

UNITED STATES PATENT AND TRADEMARK OFFICE
CERTIFICATE OF CORRECTION

PATENT NO. : 6,129,937

DATED : October 10, 2000

INVENTORS : Zurbirggen et al.

It is certified that error appears in the above-identified patent and that said Letters Patent is hereby corrected as shown below:

Column 8, claim 11, line 2, change "6" to --25--.

Signed and Sealed this

Twenty-fourth Day of April, 2001

Attest:

NICHOLAS P. GODICI

Attesting Officer

Acting Director of the United States Patent and Trademark Office